3,065,276
Patented Nov. 20, 1962

3,065,276
ALKYLENE OXIDE ADDUCTS OF 2,2-(HYDROXY-ARYL) ETHANOLS
Howard R. Guest and Robert K. Barnes, Charleston, W. Va., assignors to Union Carbide Corporation, a corporation of New York
No Drawing. Filed Sept. 4, 1959, Ser. No. 838,029
4 Claims. (Cl. 260—613)

This invention relates to new chemical compounds, and more particularly to alkylene oxide adducts of 2,2-(hydroxyaryl)ethanols which have useful application as intermediates in the preparation of foams.

The compounds of the invention may be exemplified in simplification by the following general formula:

I
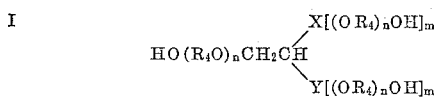

in which X and Y represent divalent aryl radicals; $R_4$ is a member of the class of ethylene radicals, propylene radicals or mixtures thereof; $n$ is a number having a value of at least one; and $m$ is an integer of one to five and preferably one to three. The compounds which conform to the structural configuration shown above are designated as hydroxypolyalkyleneoxy ethers of 2,2-(hydroxyaryl)-ethanols and are obtained by reacting an alkylene oxide with a 2,2-(hydroxyaryl)ethanol in the presence of an alkaline catalyst. Because of their aromatic nuclei and polyfunctional nature the compounds are especially suited for reaction with isocyanates in the production of elastomers and foams.

The 2,2-(hydroxyaryl)ethanol compounds which are used as starting materials for reaction with alkylene oxides are prepared by reacting a phenolic compound with 2-hydroxymethyl-1,3-dioxolane in the presence of an acid catalyst. The reaction is generally carried out at temperatures of about 40 to 130° C., under atmospheric or superatmospheric pressure, with the phenolic compound being present in the reaction mixture in a ratio of at least two moles per mole of 2-hydroxymethyl-1,3-dioxolane, and preferably within the range of two to eight moles. Upon completion of the reaction, which usually requires about one-half to six hours, the reaction mixture is subjected to a simple stripping distillation and the desired 2,2-(hydroxyaryl)-ethanol recovered as a residue product. The products of the reaction generally contain a mixture of isomers in which the hydroxyl groups are located in the ortho or para position. The reaction may be illustrated by the following equation in which R is a hydrogen atom or monovalent radical and $a$ is an integer of 1 to 5, preferably 1 to 3.

II
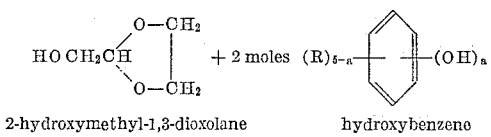

2-hydroxymethyl-1,3-dioxolane     hydroxybenzene

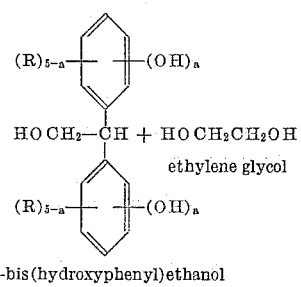

2,2-bis(hydroxyphenyl)ethanol

The reaction between phenolic compounds and the 2-hydroxymethyl-1,3-dioxolane is catalyzed by an organic acid or mineral acid used in an amount varying between 0.01% to 10%, preferably about 0.1% to 5%, by weight based on the weight of the reactants. Exemplary catalysts include p-toluenesulfonic acid, chloroacetic acid, ethanesulfonic acid, sulfuric acid, hydrochloric acid, zinc chloride, and the like.

If desired, the reaction can be carried out in the presence of an inert solvent such as dioxane, tetrahydrofuran, ethyl ether, diethyl ether, diisopropyl ether, etc.

The phenolic compounds reacted with 2-hydroxymethyl-1,3-dioxolane to obtain the 2,2-(hydroxyaryl)ethanol starting materials, and which also provide the divalent aryl radicals X and Y as represented in Formula I above, include a wide variety of compounds in which a hydroxyaryl radical is contained. As used herein the term "phenolic" refers to a hydroxyaryl compound in which a hydroxy group is directly attached to an aromatic nucleus. The term "phenolic" thus includes the mononuclear mono- and polyhydroxybenzenes such as phenol and resorcinol, etc.; hydrocarbon-substituted hydroxybenzenes such as 4-tolylresorcinol, p-phenylphenol, p-benzylphenol, etc.; fused aromatic systems such as $\alpha$ and $\beta$ naphthol, etc.; and the polynuclear hydroxybenzenes such as the various di-, tri- and tetraphenylol compounds. The phenolic compounds must have at least one reactive ortho or para position open and can be substituted to the extent that the substituents are non-reactive, i.e., they do not substantially interfere with reaction between 2-hydroxymethyl-1,3-dioxolane and a phenolic hydroxyl under the reaction conditions employed. As an example, the phenolic compounds may have only hydrogen atoms on the benzene nucleus, or they can be substituted with one or more monovalent substituents in replacement of hydrogen atoms as with nitro, fluoro, chloro, bromo, sulfo, sulfino, phospho, etc., and the organic derivatives thereof. Similarly, if a monovalent hydrocarbon radical is attached to the benzene nucleus one or more of its hydrogen atoms may be replaced with a nitro or tertiary amine group, or with a halogen such as chlorine or bromine, etc.

Exemplary mononuclear monohydroxy benzenes which can be utilized include phenol, o-, m- or p-cresols, 2,3,5,6-tetramethyl phenol, ethyl and diethyl phenols, amyl phenols, nonyl phenols, p-cyclohexyl phenol, 2,6-dicyclohexyl phenol, cyclopentyl phenol, cycloheptyl phenol, the xylenols, bromophenols, nitrophenols, the chlorophenols, e.g., 2-methyl-5-chlorophenol, and alkoxyphenols such as the isomeric methoxy, ethoxy and butoxy phenols, as well as the dialkyl ethers such as the 1,3-dimethylether of pyrogallol. Exemplary mononuclear polyhydroxy benzenes include resorcinol, pyrogallol, phloroglucinol, catechol, orcinol, methyl phloroglucinol, 2,5,6-trimethyl resorcinol, 4 ethyl-5,6-dimethyl resorcinol, eugenol, isoeugenol, 4-cyclohexyl resorcinol, 4-chloro-5-methyl resorcinol, and the like.

Exemplary fused aromatic ring systems, in addition to the $\alpha$ and $\beta$ naphthols above mentioned, include the alkyl substituted $\alpha$ and $\beta$ naphthols, e.g., 6,8-dimethyl-1-naphthol, 4-butyl-1-naphthol, 1,5-dimethyl-2-naphthol, etc.; the aromatic derivatives of tetralin, such as tetrahydro $\alpha$ naphthol; and various $\alpha$ and $\beta$ hydroxyanthracenes.

The polynuclear hydroxybenzenes which may be employed, as above noted, include the various di-, tri- and tetraphenylols in which two to four hydroxybenzene groups are attached to an aliphatic hydrocarbon radical containing one to twelve carbon atoms. The term "polynuclear" as distinguished from "mononuclear" is used to designate at least two benzene nuclei in a compound in which at least one hydroxyl group is directly attached to each benzene nucleus.

Exemplary diphenylol compounds include 2,2-bis(p-hydroxyphenyl)propane; bis(p-hydroxyphenyl)methane and the various diphenols and diphenylol methanes disclosed in U.S. Patents 2,506,486 and 2,744,882, respectively.

Exemplary triphenylol compounds which can be employed include the alpha, alpha, omega, tris(hydroxyphenyl)alkanes such as 1,1,3-tris(hydroxyphenyl)ethanes; 1,1,3-tris(hydroxyphenyl)propanes; 1,1,3-tris(hydroxy-3-methylphenyl)propanes; 1,1,3-tris(dihydroxy - 3 - methylphenyl)propanes; 1,1,3-tris(hydroxy-2,4-dimethylphenyl)propane; 1,1,3-tris(hydroxy-2,5-dimethylphenyl)propanes; 1,1,3-tris(hydroxy-2,6-dimethylphenyl)propane; 1,1,4-tris hydroxyphenyl)butanes; 1,1,4 - tris(hydroxyphenyl) - 2-ethylbutanes; 1,1,4 - tris(dihydroxyphenyl)butanes; 1,1,5-tris-(hydroxyphenyl) - 3 - methylpentanes; 1,1,8 - tris(hydroxyphenyl)octanes; 1,1,10-tris(hydroxyphenyl)decanes, and such corresponding compounds which contain substituent groups in the hydrocarbon chain, such as 1,1,3-tris(hydroxyphenyl) - 2 - chloropropanes; 1,1,3 - tris-(hydroxy-3-propylphenyl) - 2 - nitropropanes; 1,1,4 - tris(hydroxy-3-decylphenyl)2,3-dibromobutanes; and the like.

Tetraphenylol compounds which can be used in preparations of the new polyols include the alpha, alpha, omega, omega, tetrakis(hydroxyphenyl)alkanes such as 1,1,2,2-tetrakis(hydroxyphenyl)ethanes; 1,1,3,3-tetrakis(hydroxy-3-methylphenyl)propanes; 1,1,3,3 - tetrakis(dihydroxy - 3-methylphenyl)propanes; 1,1,4,4-tetrakis(hydroxyphenyl)-butanes; 1,1,4,4 - tetrakis(hydroxyphenyl)-2-ethylbutanes; 1,1,5,5-tetrakis(hydroxyphenyl)pentanes; 1,1,5,5-tetrakis-(hydroxyphenyl)-3-methylpentanes; 1,1,5,5 - tetrakis-(dihydroxyphenyl)pentanes; 1,1,8,8-tetrakis(hydroxy-3-butylphenyl)octanes; 1,1,8,8 - tetrakis(dihydroxy - 3 - butylphenyl)octanes; 1,1,8,8-tetrakis(hydroxy - 2,5 - dimethylphenyl)octanes; 1,1,10,10 - tetrakis(hydroxyphenyl)decanes, and the corresponding compounds which contain substituent groups in the hydrocarbon chain, such as 1,1,6,6-tetrakis(hydroxyphenyl)-2-hydroxyhexanes; 1,1,6,6,-tetrakis(hydroxyphenyl)-2-hydroxy-5-methylhexanes; 1,1,7,7-tetrakis(hydroxyphenyl)-3-hydroxyheptanes; 1,1,3,3-tetrakis(hydroxyphenyl) - 2 - nitropropanes; 1,1,3,3-tetrakis-(hydroxyphenyl) - 2 - chloropropanes; 1,1,4,4-tetrakis(hydroxyphenyl)-2,3-dibromobutanes; and the like.

The phenolic compounds employed may be a single compound of definite composition or a mixture of isomers together with a small amount of residue product as obtained in the preparation of such compounds. Mixtures of phenolic compounds may also be used.

To obtain the alkylene oxide adducts of the invention, the 2,2-(hydroxyaryl)ethanol compound is reacted with a 1,2-alkylene oxide selected from the group of ethylene oxide and proylene oxide, or mixtures thereof. The reaction is conducted in the presence of a small amount of catalyst by adding the alkylene oxide to the ethanol compound which is preferably stirred and in a molten state. If desired, the ethanol compound can be slurried in an inert solvent, e.g., dioxane, isopropyl ether or other suitable solvents, and then reacted with alkylene oxide. The reaction is carried out under atmospheric or superatmospheric pressure at temperatures of about 110 to 170° C. To the extent required conventional heat transfer means can be used to remove the exothermic heat of reaction.

The amount of alkylene oxide to be used is determined by the average molecular weight of the product desired. For the new reaction products described herein which have utility as intermediates in the preparation of foams, the molecular weights, based on the hydroxyl value, can range from about 300 to 10,000 or more. To obtain such products having the desired molecular weights the ethanol starting materials are treated with the 1,2-alkylene oxide until each adduct represented in Formula I above by —$(OR_4)_nOH$ contains at least one mole of alkylene oxide. The addition of alkylene oxide to a hydroxyl group can be balanced or unbalanced, i.e., each may contain approximately the same or different average number of alkylene oxide groups per chain. For high molecular weight products the total moles of alkylene oxide reacted with each hydroxyl group can range from one to about 100 moles, or more.

The time required for completion of the alkylene oxide addition will vary. In general a longer time of alkylene oxide addition is required for products of high molecular weight whereas with a low molecular weight product the reaction is faster and the addition time is short. Additionally, at lower temperatures than those above described, the alkylene oxide addition for high molecular weight products, e.g. 10,000 or more, may require an impractical amount of time such as several weeks. For the products hereinafter prepared, the time required for alkylene oxide addition ranged from about 6 hours to several days.

In carrying out the alkylene oxide reaction with the 2,2-(hydroxyaryl)ethanol compounds, any of the known catalysts for this type of addition reaction can be employed. The preferred catalysts are alkaline catalysts, e.g., alkali metal catalysts such as sodium hydroxide, potassium hydroxide and potassium t-butoxide. The amount of catalyst employed may be in the range of 0.002 to 2.0 percent by weight, based on the total amount of reactants, including the alkylene oxide or mixtures thereof appearing in the reaction product. An amount of active catalyst within this range is not so large as to cause difficulty in removal of catalyst or introduction of excess inorganics in the final product, and good results have been obtained with about 0.01 to 0.5 percent by weight, based on the total reactants, of sodium hydroxide or potassium t-butoxide. All of the catalyst need not be added at the start of the reaction. If desired, a suitable amount may be initially added and the remainder of the catalyst added from time to time throughout the course of the reaction to maintain a substantially constant catalyst concentration.

The average molecular weight and reactivity of the alkylene oxide adducts prepared herein can be determined readily by analysis for hydroxyl content. The hydroxyl number is a measure of and is proportional to the hydroxyl concentration per unit weight. The hydroxyl number is defined in terms of milligrams of KOH equivalent per gram of reaction product and is determined by reacting acetic anhydride (in pyridine solution) at refluxing temperatures with the hydroxyl groups of the alkylene oxide adduct. The unreacted anhydride and acetic acid formed are titrated with standard base using phenolphthalein as an indicator. The molecular weight can be readily calculated from the hydroxy number by using the formula.

$$M.W. = \frac{\text{Functionality} \times 1000 \times 56.1}{\text{Hydroxyl No.}}$$

The alkylene oxide adducts of the invention are useful in the preparation of rigid foams and can also be used advantageously as intermediates for a wide variety of elastomers and flexible polyurethane foams which can be prepared from relatively inexpensive and available starting materials. Polyurethane foams made from the new compounds of the invention by reaction of the terminal hydroxyl groups with polyisocyanates display good low temperature properties as compared with foams produced, for example, by isocyanate modification of dicarboxylic acid-triol polyester.

The advantages and utility of the invention will become further apparent from the following detailed examples included to illustrate the best modes now contemplated for carrying out the invention.

*Example 1*

230 grams of 2,2-bis(hydroxyphenyl)ethanol[1] and 15 grams of potassium t-butoxide are charged to a reactor and heated to a temperature of about 120° C. A slight excess of 6 moles of propylene oxide are added at a rate to maintain a pressure between 28 to 33 p.s.i. in the

[1] Reaction product derived from 2 mole sof phenol and 1 mole of 2-hydroxymethyl-1,3-dioxolane. Hydroxyl No. 732.3.

reactor. When the reaction is complete the residue is diluted with isopropanol, treated with Dowex 50 ion exchange resin and then stripped. The product obtained has an equivalent weight per hydroxyl of 201 which corresponds to a Hydroxyl No. of about 279.

*Example II*

258 grams of 2,2-bis(methyl-hydroxyphenyl)ethanol[2] and 15 grams of potassium t-butoxide are reacted with nine moles of ethylene oxide in the same manner as described in Example I. The temperature of the reaction is maintained at about 120° C. under a pressure of 28 to 40 p.s.i. The product obtained has an equivalent weight per hydroxyl of about 218 which corresponds to a Hydroxyl No. of about 257.

*Example III*

294 grams of 2,2-bis(trihydroxyphenyl)ethanol[3] and 15 grams of potassium t-butoxide are reacted with a mixture of eight moles of propylene oxide and eight moles of ethylene oxide. The reaction is carried out at a temperature of about 130° C. under a pressure of about 28 to 40 p.s.i. The product obtained has an equivalent weight per hydroxyl of 158.5 which corresponds to a hydroxyl No. of about 354.

*Example IV*

One hundred and forty grams of the propylene oxide adduct of 2,2-bis(hydroxyphenyl)ethanol as prepared in Example I were mixed with 0.89 gram of dibutyltin dilaurate, 1.3 grams of a silicone oil surfactant (a siloxane-oxyalkylene copolymer) and 41 grams of "Freon 11." 60.4 grams of a mixture of 80% 2,4–20% 2,6-tolylene diisocyanates were then added under intensive agitation. As soon as the foaming reaction began, the mixture was transferred into an open mold.

The foaming was fast and the foam was allowed to

[2] Reaction product derived from 8 moles of ortho-cresol and 4 moles of 2-hydroxymethyl-1,3-dioxolane. Hydroxyl No. 652.3.

[3] Reaction product derived from 2 moles of pyrogallol and one mole of 2-hydroxymethyl-1,3-dioxolane. Hydroxyl No. 1335.

cure for 10 minutes at 70° C. After two weeks aging at ambient temperature the foam had the following physical properties:

Density, lbs./ft.$^3$ _____ 1.6
Maximum compression load, p.s.i., at 4.8% deflection _____ 33
Closed cells, percent _____ 90

What is claimed is:

1. As a composition of matter, a 2,2-(hydroxyaryl)-ethanol hydroxypolyalkyleneoxy ether of the formula:

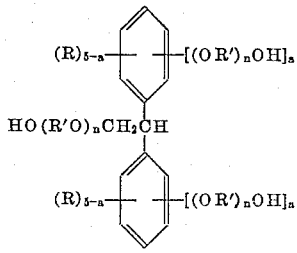

wherein R is a member selected efrom the group consisting of hydrogen and lower alkyl radicals; R' is a member selected from the group consisting of ethylene radicals, propylene radicals and mixtures thereof; $a$ is an integer of one to five; and $n$ is an integer from one to about one hundred.

2. The composition of claim 1 wherein said ethanol compound is 2,2-(hydroxyphenyl)ethanol.

3. The composition of claim 1, wherein said ethanol compound is 2,2-(methyl-hydroxyphenyl)ethanol.

4. The composition of claim 1 wherein said ethanol compound is 2,2-(trihydroxyphenyl)ethanol.

References Cited in the file of this patent

UNITED STATES PATENTS 2,843,568    Benning et al. _____ July 15, 1958
2,859,250    Woodbridge et al. _____ Nov. 4, 1958